June 6, 1950 P. A. KUSTRA 2,510,747

ELECTRICAL RECORDING DEVICE

Filed March 18, 1947 2 Sheets-Sheet 1

INVENTOR
PETER A. KUSTRA
By [signature]
ATTORNEY

June 6, 1950 P. A. KUSTRA 2,510,747

ELECTRICAL RECORDING DEVICE

Filed March 18, 1947 2 Sheets-Sheet 2

INVENTOR
PETER A. KUSTRA

BY J. H. Cook
ATTORNEY

Patented June 6, 1950 2,510,747

UNITED STATES PATENT OFFICE 2,510,747

ELECTRICAL RECORDING DEVICE

Peter A. Kustra, St. Louis, Mo.

Application March 18, 1947, Serial No. 735,372

7 Claims. (Cl. 179—5.5)

This invention relates to electrical recording devices, and particularly to such a structure which is used to make a record of the calling party's telephone number on a similar structure which is connected with the called party's telephone. As far as I am aware, there is now no apparatus in use whereby the calling party can make a record of his number for the information of the called party when the called telephone is not answered, for instance, when there is no one within hearing of the telephone bell who could answer and take down a number; and the main object of the present invention is to supply this need. My device is of simple construction, having few parts and those of such a nature as not likely to get out of order through ordinary usage.

In the drawings—

Figure 1:
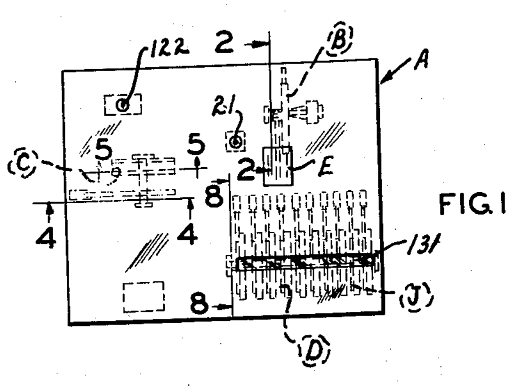
Fig. 1 is a top plan view of my electrical recording device.

The invention comprises mechanism for impulsating a unit connected with the calling telephone to transmit the calling number to mechanism connected with the called telephone in order to record the calling number. Identical mechanisms are connected with both the calling and the called telephones, so that either is capable both of transmitting the calling number and of receiving and making a record thereof at the called number, and of clearing the mechanism. This entire mechanism is enclosed in a housing A.

My device consists generally of three units enclosed in the housing A, which comprise an impulsating unit B, a selector unit C, and a recording unit D, each of the units B, C, and D being connected by wires directly with the electrical circuit that operates the telephone.

The impulsating unit B consists of a wheel 1 having several groups of peripheral teeth thereon designated by the numerals 2, 3, 4, 5, and 6, respectively. The impulsating wheel 1 is mounted on a rotatable shaft 7 which is journaled at 8 in two supports 9 and 10, respectively, secured to the bottom of the housing A and extending upwardly therefrom. A small gear wheel 11 is firmly secured to one side of the impulsating wheel 1 and surrounds the shaft 7 and rotates therewith.

Figure 2:
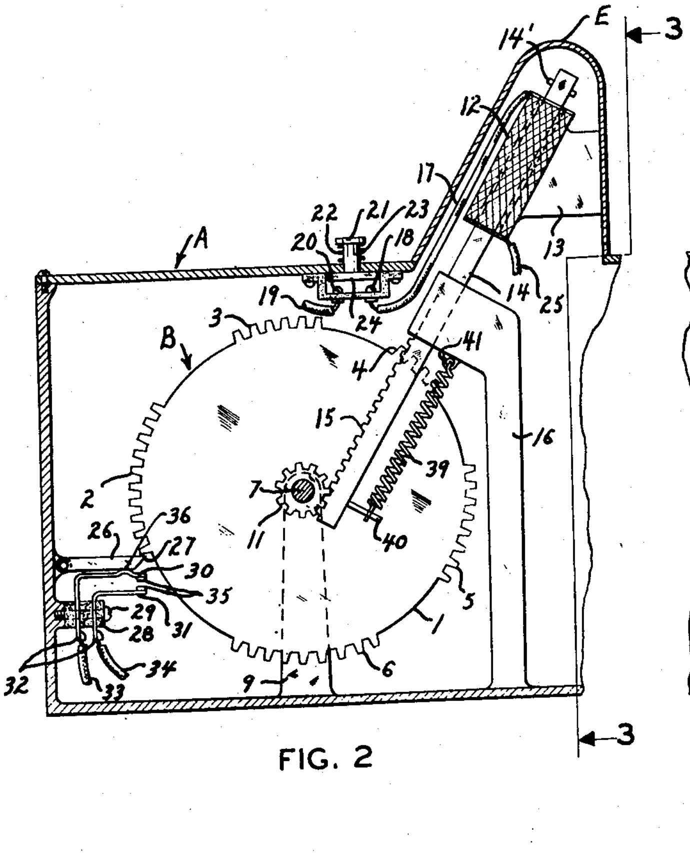
Fig. 2 is an enlarged cross-sectional view taken on line 2—2, Fig. 1, showing particularly the impulsating unit.
Figure 3:
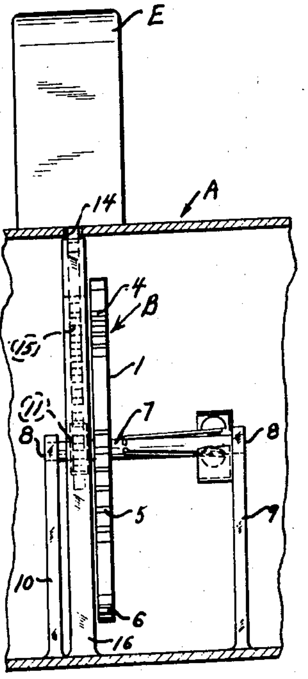
Fig. 3 is a view taken on line 3—3, Fig. 2.

The housing A at its top has an upwardly extending portion E, in which is contained a solenoid 12 secured to a support 13 extending forwardly from the rear of the upwardly extending portion E. A bar 14, provided at its lower portion with a series of teeth 15, extends longitudinally through the solenoid 12, the teeth 15 meshing with the gear wheel 11 for the purpose of rotating the wheel 1 in a clockwise direction. A stop 14′ is provided on the bar 14 and may be at any convenient place for limiting its downward movement when the solenoid 12 is energized, so that the wheel 1, when rotated by the teeth 15 of the bar 14, will only move one complete revolution in a clockwise direction. The bar 14 is held by and slidable through the upper, forwardly extending end of a support 16 which is mounted inside of the housing A (Fig. 2).

The solenoid 12 is connected by a wire 17 to a terminal contact member 18. A wire 19 connected with another terminal contact member 20 leads to the telephone circuit, so that an electrical impulse may be conducted from the telephone circuit through said wire 19. A push button 21 extends upwardly from the top of the housing A (Fig. 2) and is surrounded by a compression spring 22 for restoring said push button to its original position when pressure on said button is released. At the lower end of the rod 23 of the push button 21 is secured a metal plate 24 which, when the push button 21 is depressed, contacts both of the terminal contact members 18 and 20 so as to conduct the electrical current from the wire 19 to the solenoid 12 for energizing said solenoid. The electrical current, passing through the wire 19 and the terminal contact members 18 and 20, passes through the wire 17, through the solenoid 12, and through a wire 25 back to the telephone circuit. When energized the solenoid 12 drives the bar 14 downwardly, which causes the teeth 15, meshing with the gear wheel 11 to rotate the impulsating wheel 1 a full revolution in a clockwise direction.

Attached to the interior front of the housing A and extending rearwardly therefrom is a pivoted finger 26, which has a beveled point 27, said point 27 extending into the path of travel of the groups of teeth 2, 3, 4, 5, and 6 on the periphery of the impulsating wheel 1. Extending upwardly from an insulating block 28 which is secured to the inner face of the housing A by a screw 29 are two angularly bent, flexible conducting members 30 and 31, respectively. The flexible members 30 and 31 are attached at 32 to two wires 33 and 34, respectively. The wire 33 is attached at some convenient point to the telephone circuit and is adapted to pass current from said telephone circuit to the flexible conducting member 30. The flexible members 30 and 31 terminate at their outer ends in contact points 35. The flexible member 30 is preferably provided with a bend 36 which lies against the bottom face of the finger 26 and provides a rounded bearing for moving said member 30 downwardly. The insulating block 28 is located just beneath the pivotal mounting of the finger 26. The member 30 has sufficient springiness to restore it to its uppermost position when pressure thereon is released.

The wire 34 leads to a magnet 37, which magnet is a part of the selector unit C. A wire 38 leads from the magnet 37 to return the electrical current back to the telephone circuit. The purpose of the wires 34 and 38 is to permit the magnet 37 to be electrically energized when the terminal points 35 are pressed together, thus closing the circuit.

A coil spring 39 is secured at its lower end to a member 40 projecting from an edge of the bar 14 and is attached at its upper end to another bar 41 on the inclined portion of the support 16. When the bar 14 is driven downwardly by the energizing of the solenoid 12 as far as the stop 14′ will permit, the spring 39 is stretched, and when the bar 14 reaches its lowermost position and pressure upon the button 21 is released and the solenoid is de-energized, the spring 39 will return the bar 14 to its upper position. As the teeth 15 mesh with the teeth on the gear wheel 11, the impulsating wheel 1 is first turned in a clockwise direction as the bar 14 moves downwardly, and in a counterclockwise direction when said bar moves upwardly.

Figure 4:
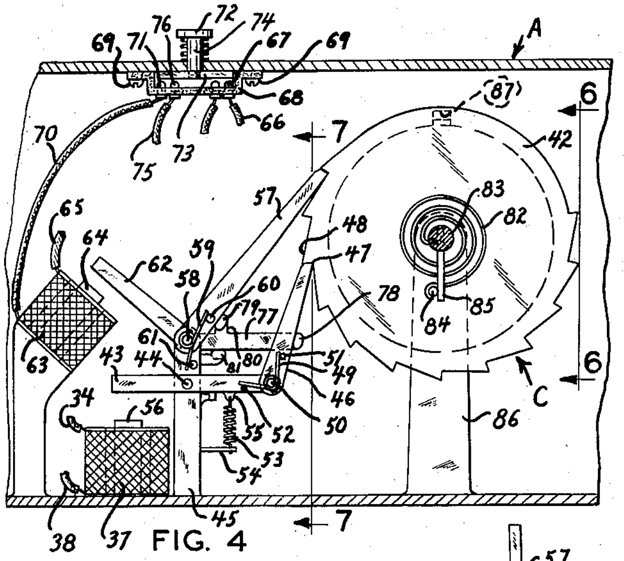
Fig. 4 is an enlarged view taken on line 4—4, Fig. 1, showing the selector unit.

As the impulsating wheel 1 rotates in a clockwise direction, the groups of teeth 6, 5, 4, 3, and 2 strike against the inclined point 27 of the pivoted finger 26, lifting said finger to permit the groups of teeth to pass thereby without operating any of the recording mechanism. When the impulsating wheel 1 has made a complete revolution in a clockwise direction, and tends to return when the solenoid is de-energized through the action of the spring 39 in a counterclockwise direction to its original position, the teeth in each group will strike the upper, outer point 27 of the pivoted finger 26, depressing the same against the bent portion 36 on the flexible member 30, causing said member 30 to be flexed downwardly and bringing the contact points 35 together, thus permitting current to pass through wire 33, flexible member 30, contact points 35, and flexible member 31 to wire 34, and thence to the magnet 37 (Fig. 4). The contact points 35 are preferably quite close to each other.

Figure 7:
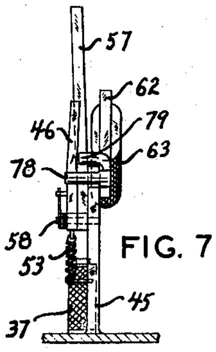
Fig. 7 is a view taken on line 7—7, Fig. 4.

As the first tooth in the group 2 strikes against the end 27 of the pivoted finger 26 and the contact between the points 35 is made, and the magnet 37 is energized, the selector wheel 42 is advanced in a clockwise direction one step in the following manner: An arm 43 is pivoted at 44 to a support 45 which projects upwardly and interiorly from the bottom of the housing A. To one end of the arm 43 is pivotally secured another arm 46 extending upwardly and outwardly so that the upper point 47 thereof may engage a tooth 48, as seen most clearly in Fig. 4. The arm 46 and its upper end 47 are held in the position shown in Fig. 7 by a spring 49 which passes about a pin 50, which pivots the arm 46 to the arm 43. The free ends of said spring 49 rest against stops 51 and 52 on the arms 46 and 43, respectively.

A spring 53 is secured to a projection 54 on the support 45 and to the underside of the arm 43, as shown at 55, which spring tends to restore the arm 43 to its normal position shown in Fig. 4 when said arm is released from contact with the magnet 37. As the magnet 37 is energized by the current passing through the wire 34, the inner end of the arm 43 is pulled down against a portion 56 of the magnet 37, which causes the arm 46 and its point 47 to be moved upwardly the space of a tooth 48. When this has been accomplished, an arm 57 slips into contact with a tooth 48, which has been moved upwardly by the arm 46, thus locking the selector wheel 42 in its advanced position the length of one tooth. The arm 57 is pivoted at 58 to the upper end of the support 45. A spring 59 is coiled about the pivot 58, one end of said spring resting against a stop 60 on the arm 57 and its other end resting against a stop 61 near the top of the support 45, which tends to keep the upper end of the arm 57 resting against the periphery of the selector wheel 42 and engaging against a tooth 48, as shown in Fig. 4.

Also pivoted at 58 is another arm 62 which extends at a right angle to arm 57. A magnet 63, having a contact point 64, is intended, when energized, to pull the upper end of the arm 62 against the contact point 64, which moves the arm 57 out of contact with a tooth 48. The electrical current for energizing the magnet 63 passes through a wire 65, which is a continuation of a wire 66 shown in Fig. 4, which wire 66 is connected to a contact point 67 located in an insulated member 68 secured by screws 69 to the upper, inside portion of the housing A, also shown in Fig. 4. Another wire 70, also having a contact point 71 located in the member 68, leads to the magnet 63, so that when a push button 72 is depressed a plate 73 at the lower end of a pin 74 on the push button 72 presses against the contact points 67 and 71. Wires 75 having contact points 76 in the member 68 lead to the telephone circuit. When the button 72 is depressed, establishing contact between the contact points 67, 71, and 76, electrical energy passes to the magnet 63 and energizes said magnet, causing the outer end of the arm 62 to move downwardly against the contact point 64 of the magnet 63, thus pulling downwardly the upper end of arm 57 to dissociate the same from a tooth 48 of the selector wheel 42.

Integral with the arm 57 is another arm 77, angularly disposed to said arm 57 and attached to said arm at the point where the arm 57 is pivoted at 58, as shown in Fig. 4. At the forward end of the arm 77 is a projection 78 which extends at a right angle from the face of the arm 77 and against which the arm 46 is adapted to rest. Another projection 79 extends from an extension 80 on the upper part of the arm 77, which projection rests against the lower edge of the arm 57. A stop 81 is provided for the purpose of limiting the downward movement of the arm 77. The stop 81 is an integral part of the support 45 and projects outwardly therefrom.

When the arm 62 is moved downwardly against the contact point 64 of the magnet 63 and the upper end of arm 57 is moved out of contact with a tooth 48 of the selector unit 42, the arm 79 also moves upwardly, pressing against one edge of the arm 46 and disengaging the point 47 from a tooth 48, thus releasing the selector wheel 42 from contact with both of the arms 46 and 57. This permits the selector wheel 42 to return to its normal position as shown in Fig. 4 through the action of a coil spring 82, which is secured at its inner end to a shaft 83 and its outer end rests against a stop 84. From the shaft 83 projects an arm 85, which also strikes against the stop 84 when the selector wheel 42 is in the neutral position shown in Fig. 4. The shaft 83, on which is mounted the selector wheel 42, is journaled in the upper ends of supports 86 which project upwardly from the bottom of the interior of the housing A.

Figure 6:
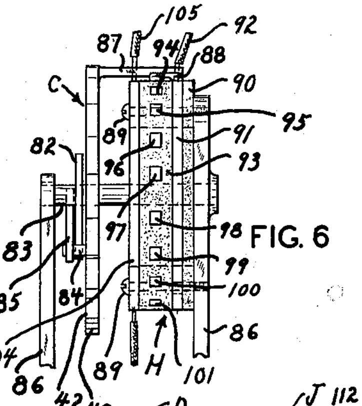
Fig. 6 is a view taken on line 6—6, Fig. 4, showing the selector unit.

To one face of the selector wheel 42 near the periphery thereof and extending at a right angle thereto is an arm 87, shown most clearly in Fig. 6. At the outer end of the arm 87 is a double electrical contact member 88, which is movable step by step the length of a tooth 48 on the selector wheel 42 when the magnet 37 is energized, thus causing the arm 46 to advance the selector wheel 42 the space of a tooth 48.

Figure 5:
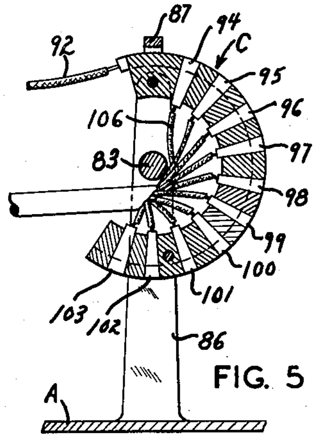
Fig. 5 is an enlarged view taken on line 5—5, Fig. 1.

An insulated assembly, which I have represented generally by the letter H, is secured by screws 89 to one of the supports 86. The insulated assembly H is composed of a section of insulating material 90, which presses against a metallic section 91, said section 91 being connected by a wire 92 to the telephone circuit. Against the metallic section 91 is another insulated section 93 in which there are segments 94, 95, 96, 97, 98, 99, 100, 101, 102, and 103, insulated from each other, as shown in Figs. 5 and 6. Another metallic section 104 is secured in the assembly H by the screws 89, and from this section 104 a wire 105 leads back to the telephone circuit.

When the magnet 37 is energized and draws down the free end of the bar 43, thus imparting movement to the selector 42 to the extent of one of the teeth 48, this moves the bar 87, which projects from near the periphery of the unit wheel 42, forwardly one step, thus bringing one of the contact points 88 into engagement with the first segment 94, the other being always in contact with the periphery of metallic section 91, and electric current passes from the metallic section 91 through the contact points 88 and the segment 94, through a wire 106 to a magnet 107, thus energizing said magnet.

Figure 10:
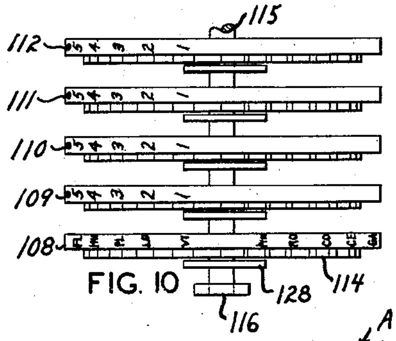
Fig. 10 is a view taken on line 10—10, Fig. 8.
Figure 8:
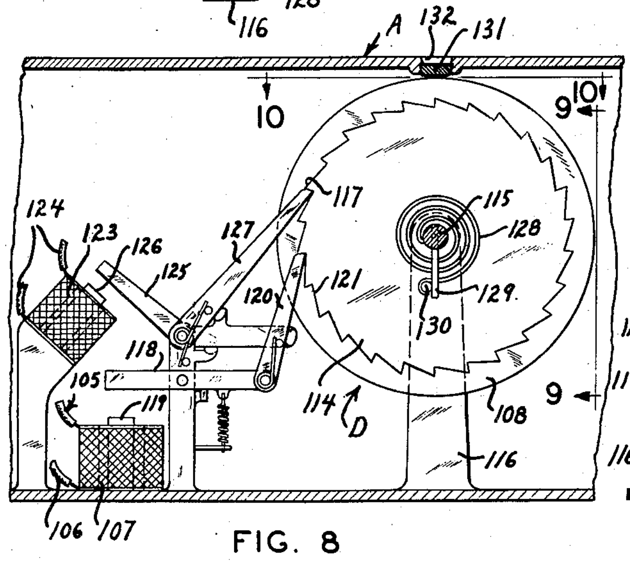
Fig. 8 is an enlarged view taken on line 8—8, Fig. 1, showing one of the recording unit operating members.

The device shown in Fig. 8 is the recording device D, and the same mechanism is associated with each of the recording wheels 108, 109, 110, 111, and 112. Each of the segments 94 to 103, inclusive, is connected by wires similar to wire 105 above referred to with magnets similar to magnet 107 (Fig. 8), and the mechanism shown in Fig. 8 is identical with the mechanism for operating recording wheels 109, 110, 111, and 112, which appear in Figs. 9 and 10.

Figure 9:
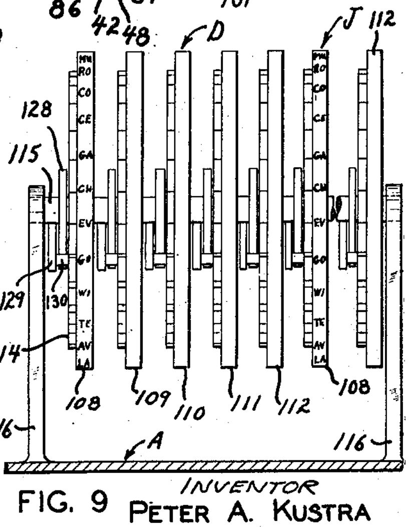
Fig. 9 is a view taken on line 9—9, Fig. 8.

A recording wheel 108, to which is secured a toothed wheel 114, is mounted on a shaft 115 which is journaled in the upper end of supports 116, which project upwardly from the bottom of the housing A. It may be noted that in the recording device herein shown and described there are only five recording wheels, the first (108) for the exchange, and the other four (109, 110, 111, and 112) for the digits representing the number of the telephone. These digit wheels can be diminished or added to, should there be more or less than four groups of digits in the telephone numbers. As shown in Fig. 9, the broken away portion of the shaft 115 near the righthand side of said figure is intended to designate that a series of groups of exchange and telephone numbers can be placed in line in the recording bank D, so that several telephone numbers may be represented in the recording mechanism J adjacent the called party's telephone (Fig. 1).

It will be noted that the teeth 48 on the selector wheel 42 are greater in length than the teeth 117 on the toothed member 114 attached to the wheel 113. The reason for this will be hereinafter explained.

When the magnet 107 is energized as the arm 87 and the contact members 92 move into contact step by step with the segments 94 to 103, inclusive, it immediately brings down the arm 118 against the contact member 119 in the magnet 107, which forces up the arm 120, which in turn moves the toothed wheel 114, which moves upwaradly the wheel 113 and the toothed wheel 114 attached thereto the space of one toothed 121. The wheel 108, which in Figs. 9 and 10 designates the exchange, is moved clockwise one tooth 121 each time the magnet 107 is energized, thus operating the arms 118 and 120 for moving in a clockwise direction the wheel 108 and one of the teeth 121 on the toothed member 114 attached to the wheel 108. The operation of the mechanism shown in Fig. 8 is identical with the operation of the mechanisms shown in Fig. 4, and it is believed that a description of which mechanism at this point would be a duplication and is unnecessary. It should be noted, however, that due to the much shorter distance between the teeth 121 on the toothed wheel 114 than the teeth 48 on the selector wheel 42, the wheels 108 to 112, inclusive, move step by step so rapidly that the selector wheel 42 does not move another step or tooth until the first tooth of the next group comes in contact with the point 27 of the arm 26.

The reason for the difference in length between the teeth 48 and the teeth 121 is to maintain the selector wheel 42 in its one-tooth advanced position while the recording wheels in the group D are being advanced the required number of digits without shifting the selector wheel 42 until the entire movement of the wheel 108 is completed. It will be noted that the space between the lower edge of the arm 43 and the contact member 56 of the magnet 37 is the same distance as the length of a tooth 48 on the selector wheel 42, as shown in Fig. 4. As shown in Fig. 8, the distance between the lower edge of the bar 118 and the contact member 119 of the magnet 107 is the distance of a tooth 121 on the toothed wheel 114 secured to the wheel 108. Thus the wheel 108 and the other wheels 109 to 112, inclusive, are movable much more rapidly than the selector wheel 42, so that contact with the pointed end of the pivoted finger 26 is brief, and so that each of the teeth in the group 2 and the other groups 3, 4, 5, and 6 is only sufficient to move the wheels 108, 109, 110, 111, and 112 without fully moving the selector wheel 42 the space of a tooth 48. It will be noted in Fig. 2 that there is an appreciable space between each of the groups of teeth 2, 3, 4, 5, and 6, and that in each group the individual teeth are so spaced from each other as to permit only contact with the pointed end 27 of the finger 26 for such a length of time as to energize the magnets 107 for the purpose of serially moving the wheels 108, 109, 110, 111, and 112 the space of one of the teeth 121. When the second bank of teeth in the group 3 moves into engagement with the end 27 of the finger 26, as with the first tooth in group 2, the first contact is sufficiently long to energize the magnet 37 to advance the selector wheel 42 the full length of a tooth 48 where said selector wheel 42 is held by the arm 57 in its advanced position so that each of the segments 94 to 103, inclusive, can be contacted step by step by the movement in a clockwise direction of selector wheel 42 and through the arm 87 and one of the contact points 88.

From the preceding description, it will be seen that the mechanism is limited in its scope to setting up only one set of numbers; in other words, only one call can be registered at the called station. In order that two or more incoming calls may be recorded, it is only necessary to duplicate the mechanism herein illustrated and described.

When the recorded numbers of the several calling telephones have been noted by the person called, the recording mechanism can be cleared by pressing a button 122 (Fig. 1), which energizes the magnets 63 and 123 (similar magnets being connected to each of the wheels 42, 108, 109, 110, 111, and 112). The wires 124 are connected with the telephone circuit so that the magnets 123 may be energized when the button 122 is depressed. As the magnet 123 is energized, the arm 125 is pulled down against a contact member 126 on the magnet 123, which releases an arm 127 from its contact with a tooth 121 and also releases the arm 120 from contact with a tooth 121, as described heretofore in connection with the selector mechanism shown in Fig. 4, thus permitting the wheel 108 and the remaining wheels 109–112, inclusive, to be returned each through its spring 128 in a counterclockwise direction until the arm 129 strikes against the pin 130, as shown in Fig. 8, thus clearing the recording mechanism.

The exchange letters and the numerals appearing on the periphery of the wheels 108 to 112, inclusive, may be small enough so that only a short step by step movement of the wheels 108 to 112, inclusive, is necessary, and preferably through a magnifying glass 131 inserted in a slot 132 in the housing A the letters and figures appearing on said wheels may be easily read.

I claim:

1. An electrical recording device comprising a series of units operable consecutively, and consisting of an impulsating unit, a selector unit, and a recording unit, means for first operating said impulsating unit in a clockwise direction a complete revolution, means for returning said impulsating unit in a counterclockwise movement to its neutral position, a pivoted member in the path of travel of groups of teeth consecutively arranged on the periphery of said impulsating unit, said pivoted member being operated for imparting movement to the selector unit when the first group of teeth come in contact with said pivoted member as said impulsating unit returns to its neutral position, said first group of teeth also imparting movement to the said recording unit by contacting said pivoted member, each of said groups of teeth first imparting a one step movement to said selector unit and thereafter imparting movement to said recording unit, and means for clearing said selector and recording units.

2. An electrical recording device comprising a series of units operable consecutively, and consisting of an impulsating unit, a selector unit, and a recording unit, means for first operating said impulsating unit in a clockwise direction a complete revolution, means for returning said impulsating unit in a counterclockwise movement to its neutral position, a pivoted member in the path of travel of groups of teeth consecutively arranged on the periphery of said impulsating unit, said pivoted member being operated for imparting movement to the selector unit when the first group of teeth come in contact with said pivoted member as said impulsating unit returns to its neutral position, said first group of teeth also imparting movement to the said recording unit by contacting said pivoted member, each of said groups of teeth first imparting a one step movement to said selector unit and thereafter imparting a step by step movement to said recording unit, and means for clearing said selector and recording units.

3. An electrical recording device comprising a series of units operable consecutively, and consisting of an impulsating unit, a selector unit, and a recording unit, means for first operating said impulsating unit in a clockwise direction a complete revolution, means for returning said impulsating unit in a counterclockwise movement to its neutral position, a pivoted member in the path of travel of groups of teeth consecutively arranged on the periphery of said impulsating unit, said pivoted member being operated for imparting movement to the selector unit when the first group of teeth come in contact with said pivoted member as said impulsating unit returns to its neutral position, said first group of teeth also imparting movement to said recording unit by contacting said pivoted member, each of said groups of teeth first imparting a one step movement to said selector unit and thereafter imparting movement to said recording unit, said selector unit being provided with an arm extending therefrom for contacting a member to move said recording unit in a step by step movement, and means for clearing said selector and recording units.

4. An electrical recording device comprising a series of units operable consecutively, and consisting of an impulsating unit, a selector unit, and a recording unit, means for first operating said impulsating unit in a clockwise direction a complete revolution, means for returning said impulsating unit in a counterclockwise movement to its neutral position, a pivoted member in the path of travel of groups of teeth consecutively arranged on the periphery of said impulsating unit, said pivoted member being operated for imparting movement to the selector unit when the first group of teeth come in contact with said pivoted member as said impulsating unit returns to its neutral position, said first group of teeth also imparting movement to said recording unit by contacting said pivoted member, each of said groups of teeth first imparting a one step movement to said selector unit and thereafter imparting movement to said recording unit, a series of magnets and mechanism associated with said selector unit and recording unit for imparting step by step movement to each of said units when said magnets are energized and deenergized, and means for clearing said selector and recording units.

5. An electrical recording device comprising a series of units operable consecutively, and consisting of an impulsating unit, a selector unit, and a recording unit, means for first operating said impulsating unit in a clockwise direction a complete revolution, means for returning said impulsating unit in a counterclockwise movement to its neutral position, a pivoted member in the path of travel of groups of teeth consecutively arranged on the periphery of said impulsating unit, said pivoted member being operated for imparting movement to the selector unit when the first group of teeth come in contact with said pivoted member as said impulsating unit returns to its neutral position, said first group of teeth also imparting movement to the said recording unit by contacting said pivoted member, each of said groups of teeth first imparting a one step movement to said selector unit and thereafter imparting movement to said recording unit, and means for clearing said selector and recording units, said means comprising magnets and mechanism on said selector and recording units co-operating with said magnets when energized to clear said selector and recording units.

6. An electrical recording device comprising a series of units operable consecutively, and consisting of an impulsating unit, a selector unit, and a recording unit, means for first operating said impulsating unit in a clockwise direction one complete revolution, means for returning said impulsating unit in a counterclockwise movement to its neutral position, a series of teeth arranged in groups on the periphery of said impulsating unit for operating said selector unit, a member pivoted to said device and adapted to be operated by one of said groups of teeth as the impulsating unit is rotated in a counterclockwise direction, flexible contact members actuated by said pivoted member for energizing a magnet to impart movement to the selector unit, each of said groups of teeth first imparting a one step movement to said selector unit and thereafter imparting movement to said recording unit, and means for clearing said selector and recording units.

7. The device as set forth in claim 6, wherein said selector unit consists of a series of segments adapted to be individually energized upon rotation of said unit, and each of said segments electrically connected to said recording unit for imparting movement thereto.

PETER A. KUSTRA.

REFERENCES CITED

The following references are of record in the file of this patent:

UNITED STATES PATENTS

| Number | Name | Date |
|---|---|---|
| 1,041,536 | Warwick | Oct. 15, 1912 |
| 1,915,413 | Elkins | June 27, 1933 |
| 1,952,280 | Parker | Mar. 27, 1934 |
| 2,176,346 | Hyman | Oct. 17, 1939 |